United States Patent [19]
Bronoel et al.

[11] Patent Number: 5,344,723
[45] Date of Patent: Sep. 6, 1994

[54] BIPOLAR ELECTRODE FOR BATTERIES

[75] Inventors: Guy Bronoel, Versailles; Bernard Bugnet, Saint-Genis-Pouilly; Noelle Tassin, Fontenay-Sous-Bois, all of France

[73] Assignee: Sorapec S.A., Fontenay-Sous-Bois, France

[21] Appl. No.: 36,525

[22] Filed: Mar. 24, 1993

[30] Foreign Application Priority Data

Mar. 26, 1992 [FR] France ............................ 92 03927

[51] Int. Cl.⁵ ........................ H01M 2/12; H01M 4/70
[52] U.S. Cl. ..................................... 429/84; 429/210; 29/2
[58] Field of Search ................... 429/73, 84, 86, 87, 429/210; 29/2

[56] References Cited

U.S. PATENT DOCUMENTS

| | | | |
|---|---|---|---|
| 1,376,923 | 5/1921 | Dean | 429/84 |
| 1,907,911 | 5/1933 | Wallace et al. | 429/86 X |
| 3,795,543 | 3/1974 | Poe | |
| 4,125,680 | 11/1978 | Shropshire et al. | 429/4 |
| 4,267,243 | 5/1981 | Park et al. | 429/136 |
| 5,068,160 | 11/1991 | Clough et al. | 429/210 X |

FOREIGN PATENT DOCUMENTS

| | | |
|---|---|---|
| 2706310 | 8/1978 | Fed. Rep. of Germany. |
| 3907741 | 9/1990 | Fed. Rep. of Germany. |
| 2304188 | 10/1976 | France. |
| 62-64052 | 3/1987 | Japan. |
| 8000285 | 2/1980 | World Int. Prop. O.. |

OTHER PUBLICATIONS

Derwent English Language Abstract of German Patent No. 2,706,310 (Aug. 1978).
English Language Translation of Claims 1–3 of German Patent No. 2,706,310 (Aug. 1978).
Patents Abstracts of Japan, vol. 11, No. 254 (E-533) (2701) Aug. 1987.
French Search Report Oct. 1992.

*Primary Examiner*—Stephen Kalafut
*Attorney, Agent, or Firm*—Sandler, Greenblum & Bernstein

[57] ABSTRACT

Bipolar electrode is provided with a conductive support/separator perforated on a part which is free from active material with at least one opening which communicates by a gaseous environment in a battery between elements assembled in series. The opening prevents the passage of electrolyte from one conductive support/separator to another, and may include an advantageously hydrophobic material, which also contains an opening therethrough, and is arranged on at least one side of the opening. The bipolar electrodes are particularly applicable to sealed batteries.

27 Claims, 2 Drawing Sheets

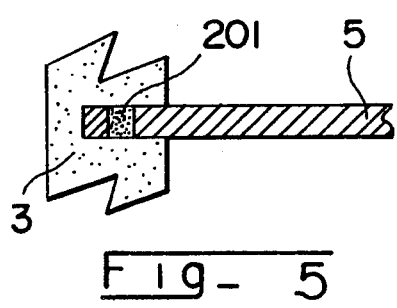
Fig_5
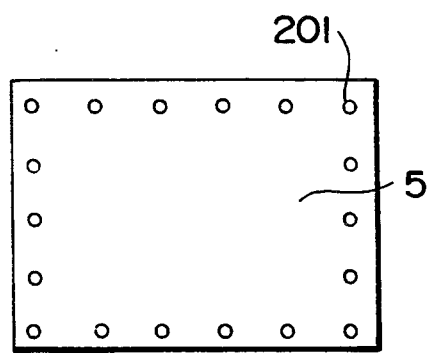
Fig_6
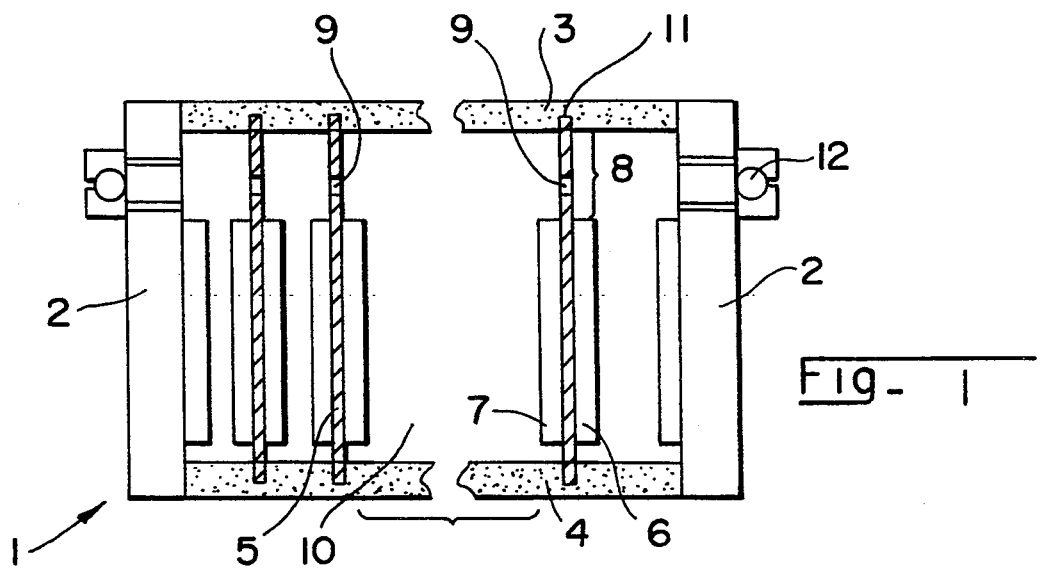
Fig_1

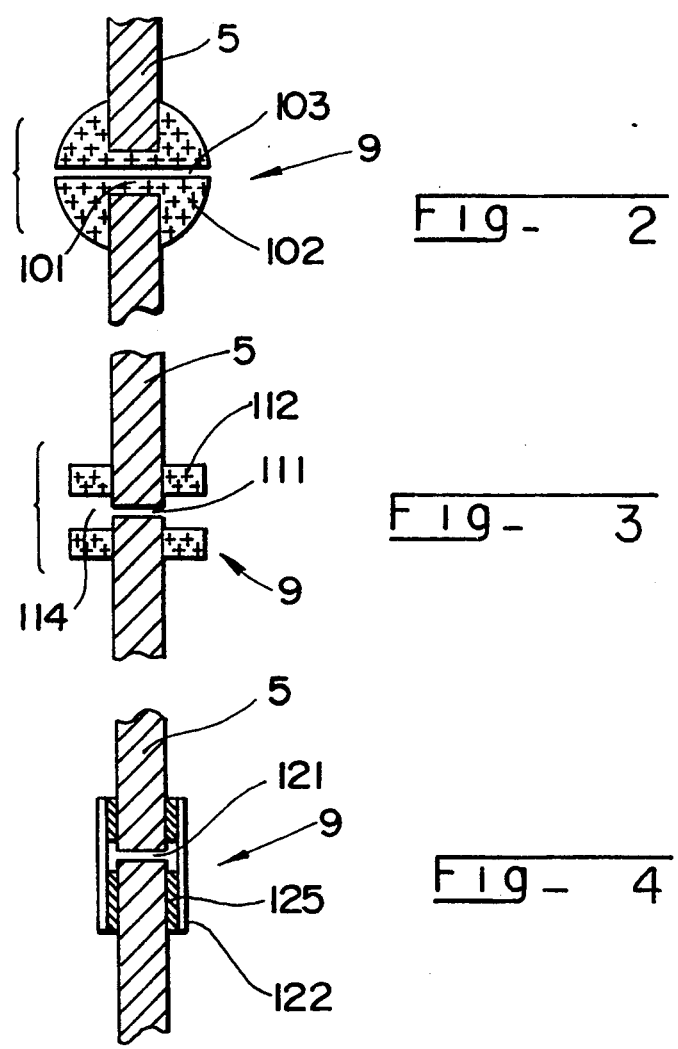

BIPOLAR ELECTRODE FOR BATTERIES

BACKGROUND OF THE INVENTION

1. Field of the Invention

The present invention concerns bipolar electrodes for batteries and is particularly concerned with one of the components thereof, the conductive support/separator which carries on each of its faces the active material forming the positive electrode on one side and the negative electrode on the other side.

2. Discussion of the Background Information

The manufacture of batteries with bipolar electrodes, be they Ni-Cd, Pb-PbO$_2$ or other couples, involves several problems some of which relates to the bipolar support/separator or its production. The bipolar support/separator is electronically conductive since, as indicated above, it carries the electrodes, and also fluid-tightly separates two successive elements.

A first problem relates to pressure differences that, during operation, may build up between different elements forming a so-called sealed battery. One of the possible causes of these pressure differences may be the existence of thermal gradients which inevitably occur between the elements adjacent the end plates which close the stack, and those adjacent the middle of the stack. These pressure differences may also be due to the electrodes situated in different elements having different electrical capacitances. Furthermore, if an excessive over-pressure is produced in one element, for safety reasons, this pressure should not exceed a predetermined threshold value. For such cases, one can envisage that each element includes a safety valve. However, since in the case of Ni-Cd, the thickness of one element is for example, between 2.5 and 3 mm, providing valves of very small dimensions is difficult, and therefore expensive.

A second problem pertains to the marginal parts of the bipolar support/separators, where the insulating structure separating on element from another is fixed. One of the means that can be provided to insure sealing between the elements consists of overmolding a structure made of a polymer, over the entire perimeter of each bipolar support/separator. This polymer must be an electrical insulator and must be stable under use conditions, i.e., in the range of temperatures and mechanical stresses it may be submitted to, and in the presence of the electrolyte used. Of course, sealing between two elements implies that there must be a good adherence between the polymer and the conductive support/separator, and also that the connection between the polymer structures of two neighboring elements must be fluid-tight. This connection may be provided by welding, for example, by locally melting the polymer.

It should, moreover be noted that the conductive support/separator, for evident reasons, because of the required light weight of the generator, is generally very thin, for example, 0.05 mm or 0.1 mm in the case of Ni-Cd. Damage to the battery can result from an elevation of the internal pressure in an element which, associated with a rise in the temperature, may produce a pressure on the internal edge of the polymer structure causing it to unstick from the conductive support/separator.

SUMMARY OF THE INVENTION

An object of the present invention is to provide the simplest possible solution to these problems.

The invention thus relates to a bipolar electrode having a conductive support/separator, wherein the support/separator is perforated, on a part thereof which is free from active material, with at least one opening which communicates, by the ambient gas, the elements assembled in series but which does not allow the electrolyte to pass from one element into another.

In the following description, by "part which is free from active material", is means the part of the support/separator which is not covered by the electrodes and which, obviously, must not form part of the frame or marginal edge, i.e., the zone which serves to hold the bipolar electrode in place inside the battery and which is embedded in an insulating structure. Typically, for a Ni-Cd or Pb-PbO$_2$ battery, for example, the free part in question has a width comprised between 5 and 30 mm, this value being notably a function of the capacity of the element and the mode of charging. These two factors define the "dead" volume that must be provided in each element in order for the internal pressures not to reach an excessive value.

In other words, at least one small opening is provided in the conductive support/separator in such a manner as to equalize the pressure. The dimensions of the at least one small opening must be such that for a maximum output of gas, at the end of charging in one element, there is no consequential variation of pressure between this element and those adjacent it. Preferably, there are from one to four openings.

Inasmuch as all of the elements communicate with one another, a possible overpressure in one element will normally not lead to an excessive pressure in the overall stack. Nevertheless, to allow for the pressure in the overall set of elements exceeding a limiting threshold value, there will advantageously be provided at least one safety valve that opens to release the pressure. These valves will no longer necessarily be situated on the elements themselves, but preferably on the end plates.

However, the risk of shunting the consecutive elements, via the electrolyte, through the openings which place the elements into communication should be prevented. It should be noted that, according to the same principle, during functioning of sealed elements, there is normally no free electrolyte in the volumes of the elements that are not filled by the electrodes and by the separator situated between the electrodes. The electrolyte is confined, by capillarity, in the pores of the electrodes and of the separator. However, it is always possible for a wetting film to subsist on all of the surfaces. Hence, to avoid the presence of this electrolyte film at the communicating opening, the or each communicating opening is advantageously made in the following way.

A hole with a diameter of the order of several mm, for example 2 to 5 mm, is bored in the conductive support. A cylinder is then force-fitted into this hole. This cylinder has a slightly greater diameter, and is, for example, made of inert plastic material such as polytetrafluoroethylene, or any other stable and preferably hydrophobic polymer, and has a thickness greater than that of the support/separator. This cylinder is preferably pre-pierced through its center, or is pierced after having been fitted, through its center, with a hole of small diameter, for example, from 0.1 to 0.5 mm, through which passes a wire, advantageously a steel wire. The cylinder is then squashed onto its two faces while conserving its central part. This squashing may be carried out hot. Once the cylinder ,fitted into the support/separator, is in place, the wire is pulled out, which leaves a free opening of corresponding diameter. This opening provides, by its central hole, communication of the atmospheres of gaseous environments of two successive elements or compartments, and, because of the hydrophobic properties of the plastic material used, in particular polytetrafluoroethylene, inhibits the formation of a continuous electrolyte film between two elements.

As a variation, it is possible to stick onto the support/separator, on either side of the hole, a disk, for example, of polytetrafluoroethylene or another advantageously hydrophobic material, as indicated above, having a central hole whose diameter is equal to or slightly greater than that of the hole in the support/separator. Of course, the polytetrafluoroethylene must stick strongly to the support/separator. To achieve this, an adhesive which remains stable in the operating conditions of the battery, such as an epoxy resin, is used.

As another variation, the central hole can be obturated, for example, as before, by means of a porous or semi-permeable patch or plug, for example, of microporous polytetrafluoroethylene, that is also stuck on.

In other words, each opening providing communication through the support/separator is thus formed by a hole, and, disposed around this hole, a thick part fitted on either side of the support/separator, having a through hole, and having any shape whatsoever, for example, annular or square. The through hole of the support/separator, and the two through holes in the thick part which are in extension thereof, may have the same diameter, or preferably the hole passing through the support/separator itself is of smaller diameter.

Advantageously, the support/separator also has further perforations on its periphery, which will serve as anchoring points for the insulating structure that holds the successive supports/separators in place.

In this variation, the conductive support/separator has perforations on its marginal edges, which perforations are filled with polymer, during molding or overmolding of the insulating structure, and will thus be embedded therein. In this manner, there is a better attachment of the insulating polymer structure onto the support/separator, and any risk of unsticking is avoided.

The diameter and the spacing of the perforations can be calculated as a function of the pressure in each element, the thickness of the support/separator and the adherence of the polymer onto the material making up the support/separator. By way of example, these perforations may be situated at a distance comprised between 2 and 6 mm from each edge of the support/separator, and regularly spaced apart by from 10 to 60 mm. Their diameter is, for example, comprised between 2 and 4 mm.

BRIEF DESCRIPTION OF THE DRAWINGS

The invention will be better understood with reference to the accompanying drawings, given by way of non-limiting embodiments. In the drawings:

FIG. 1 is a schematic overall view, in cross-section, of the battery according to the invention;

FIG. 2 shows, also in cross-section, a detail of an embodiment of the opening through the conductive support/separator of the bipolar electrode;

FIG. 3 corresponds to FIG. 2, for another embodiment;

FIG. 4 corresponds to FIG. 2, for yet another embodiment;

FIG. 5 shows, also in cross-section, a perforation of the conductive support/separator that is embedded in the insulating structure; and FIG. 6 is a view corresponding to FIG. 5 showing, in plan, a conductive support/separator comprising anchoring perforations arranged around its periphery, before providing the communicating openings and before applying thereon the active materials making up the positive or negative electrode.

DETAILED DESCRIPTION OF PREFERRED EMBODIMENTS

As shown on FIG. 1, a battery 1 comprises electrodes arrange din spaced parallel configuration with two end plates 2 closing each end of the battery. One of the end plates carries a positive electrode, whereas the other carries a negative electrode. The battery is closed by a polymer envelope that also holds the electrodes in place, and of which can be seen an upper part forming a cover 3 and a lower part forming a bottom 4.

The other, bipolar, electrodes are each formed of a conductive support/separator 5, and, on each face thereof, a positive electrode 6 on one side and a negative electrode 7 on the other side. The positive electrode 6, for example, contains hydroxides of nickel as the active material, and the negative electrode 7, for example, contains cadmium oxide as the active material.

At 8 has been shown the part of the support/separator that is free of active material, and in which is schematically shown an opening 9 that communicates the gaseous environment 10 of the consecutive elements or compartments and, by recurrence, communicates the entire inside of the battery 1. Each support/separator 5, that serves to collect electrical charge, also includes a part 11 embedded in the polymer structure 3, 4 serving as insulation and as support. Furthermore, there are schematically shown a set of two safety valves 12 on the two end plates 2.

In FIG. 2, the communicating opening 9 has been provided firstly by boring a hole 101 in the support/separator to forcably receive a piece of hydrophobic plastic 102 having a slight larger diameter and which is initially cylindrical. This piece, if it is not already pierced with a central hole 103, of a much smaller diameter, is pierced after it has been force-fitted, then it is squashed for example to the round shape shown on the drawing.

In FIG. 3, the communicating opening is made up of a hole 111 pierced in the support/separator 5, and two holes 114 in extension thereof, the latter having a larger diameter and each passing through a washer 112 stuck on each face of the support/separator 5.

As can be seen in FIG. 4, the hole 121 pierced in the support/separator 5 is obturated by two microporous membranes 122 which are stuck onto two washers 125 having a central hole, analogous to the washers 112 of FIG. 3, and which are themselves stuck onto the support/separator around the hole 121.

In FIGS. 5 and 6 a support/separator before applying thereon the active materials forming the electrodes and before piercing the communicating openings is illustrated. This support/separator has all around its periphery a series of perforations 201 that will be filled with material when the insulating structure is applied, as can easily be understood from FIG. 5. Thus, a good anchoring of the conductive supports/separators in the insulating structure will be insured.

The invention can be applied to all types of batteries, but it will readily be understood that it is particularly advantageous for the manufacture of sealed batteries where problems of internal pressure may be crucial.

What is claimed is:

1. A bipolar electrode for a battery, comprising:
   a conductive separator comprising a support including at least two portions;
   an active material on one of said two portions, and the other of said two portions being free from active material; and
   means defining at least one opening in said other of said two portions for permitting ambient gas to pass therethrough and preventing passage of electrolyte.

2. The bipolar electrode according to claim 1, wherein said means defining at least one opening comprise at least one opening of a diameter of between 0.1 and 0.5 mm.

3. The bipolar electrode according to claim 1, wherein said means defining at least one opening comprise from one to four openings for permitting ambient gas to pass through said opening and preventing passage of electrolyte.

4. The bipolar electrode according to claim 3, wherein said openings have a diameter of between 0.1 and 0.5 mm.

5. The bipolar electrode according to claim 1, wherein said means defining at least one opening comprise at least one open area in said support, at least one element associated with said at least one open area extending from at least one side of said support, and at least one aperture in said at least one element.

6. The bipolar electrode according to claim 5, wherein said at least one element is positioned in said at least one open area, and includes one aperture through said at least one element.

7. The bipolar electrode according to claim 5, wherein said at least one element comprises two elements on opposite sides of said support, and each of said two elements comprises an aperture.

8. The bipolar electrode according to claim 7, wherein said at least one open area has a smaller diameter than diameters of the aperture in each of said two elements.

9. The bipolar electrode according to claim 8, wherein the apertures in each of said two elements have substantially equal diameters.

10. The bipolar electrode according to claim 5, wherein said at least one element comprises a material having hydrophobic properties.

11. The bipolar electrode according to claim 10, wherein said material having hydrophobic properties comprises polytetrafluoroethylene.

12. The bipolar electrode according to claim 1, wherein said means defining at least one opening comprise at least one open area in said support, and a microporous membrane covering said at least one open area on each side of said support.

13. The bipolar electrode according to claim 12, further including a washer positioned between each microporous membrane and each side of said support.

14. The bipolar electrode according to claim 1, wherein said support comprises a periphery comprising a plurality of apertures.

15. A battery, comprising:
    a plurality of bipolar electrodes, each of said plurality of bipolar electrodes comprising:
       a conductive separator comprising a support including at least two portions;
       an active material on one of said two portions, and the other of said two portions being free from active material; and
       means defining at least one opening in said other of said two portions for permitting ambient gas to pass therethrough and preventing passage of electrolyte between said plurality of bipolar electrodes.

16. The battery according to claim 15, wherein said means defining at least one opening comprise at least one opening of a diameter of between 0.1 and 0.5 mm.

17. The battery according to claim 15, wherein said means defining at least one opening comprise at lest one open area in said support, at least one element associated with said at least one open area extending from at least one side of said support, and at least one aperture in said at least one element.

18. The battery according to claim 17, wherein said at least one element comprises a material having hydrophobic properties.

19. The battery according to claim 18, wherein said material having hydrophobic properties comprises polytetrafluoroethylene.

20. The battery according to claim 15, wherein said means defining at least one opening comprise at least one open area in said support, and a microporous membrane covering said at least one open area on each side of said support.

21. The battery according to claim 15, wherein said support comprises a periphery comprising a plurality of apertures, and the battery comprises an insulating structure within which said plurality of apertures is embedded.

22. The battery according to claim 15, wherein said battery further comprises end plates closing the battery, and further including at least one safety valve positioned on at least one of said end plates.

23. A method of manufacturing a bipolar electrode comprising a conductive separator comprising a support including at least two portions; an active material on one of the two portions, and the other of the two portions being free from active material; and means defining at least one opening in the other of the two portions for permitting ambient gas to pass therethrough and preventing passage of electrolyte, the method comprising:
    forming at least one open area in the other of the two portions;
    force fitting a cylinder into the at least one open area, the cylinder having a center axis, two faces and a central portion between the two faces;
    forming a hole substantially through the center axis of the cylinder;
    positioning a wire in the hole;
    squashing the cylinder on the two faces while maintaining the central portion; and
    withdrawing the wire.

24. The method of manufacturing a bipolar electrode according to claim 23, wherein the cylinder is composed of a hydrophobic material.

25. A method of manufacturing a bipolar electrode comprising a conductive separator comprising a support including at least two portions; an active material on one of the two portions, and the other of the two portions being free from active material; and means defining at least one opening in the other of the two portions for permitting ambient gas to pass therethrough and preventing passage of electrolyte, the method comprising:

forming at least one open area in the other of the two portions; and adhering a disk comprising a central opening having a diameter which is equal to or slightly greater than a diameter of the at least one open area onto at least one side of the support so that the central opening of the disk is associated with the at least one open area.

26. The method of manufacturing a bipolar electrode according to claim 25, wherein the disk is composed of a hydrophobic material.

27. The method of manufacturing a bipolar electrode according to claim 25, comprising a porous or semipermeable membrane positioned on the disk obturating the central opening of the disk.

* * * * *